(12) United States Patent
Gerber et al.

(10) Patent No.: US 8,915,092 B2
(45) Date of Patent: Dec. 23, 2014

(54) HEAT PUMP SYSTEM HAVING A PRE-PROCESSING MODULE

(75) Inventors: Manfred Gerber, Saskatoon (CA); Can Wen Rong, Saskatoon (CA)

(73) Assignee: Venmar CES, Inc., Saskatoon, Saskatchewan (CA)

( * ) Notice: Subject to any disclaimer, the term of this patent is extended or adjusted under 35 U.S.C. 154(b) by 968 days.

(21) Appl. No.: 13/009,222

(22) Filed: Jan. 19, 2011

(65) Prior Publication Data

US 2012/0180982 A1 Jul. 19, 2012

(51) Int. Cl.
| | |
|---|---|
| F25D 17/06 | (2006.01) |
| F25B 13/00 | (2006.01) |
| F24D 5/12 | (2006.01) |
| F24F 12/00 | (2006.01) |
| F24F 11/00 | (2006.01) |
| F25B 40/04 | (2006.01) |

(52) U.S. Cl.
CPC . F25B 13/00 (2013.01); F24D 5/12 (2013.01); F24F 12/00 (2013.01); Y02B 30/126 (2013.01); F24F 2011/0087 (2013.01); F25B 40/04 (2013.01); F25B 2313/021 (2013.01); F25B 2313/02741 (2013.01); F25B 2400/0405 (2013.01); F25B 2600/2501 (2013.01); F25B 2600/2517 (2013.01); Y02B 30/52 (2013.01)
USPC .............................. 62/94; 62/271

(58) Field of Classification Search
CPC .......... F25D 21/12; F25B 13/00; F25B 40/04; F25B 2313/021; F25B 2400/0405; F25B 2600/2517; F25B 2600/2501; F24D 5/17; F24F 12/00; F24F 2011/0087
USPC ........ 62/80, 82, 151, 160, 94, 271; 165/4, 59, 165/63
See application file for complete search history.

(56) References Cited

U.S. PATENT DOCUMENTS

| | | | |
|---|---|---|---|
| 5,337,574 A | 8/1994 | Dick | |
| 5,351,497 A | 10/1994 | Lowenstein | |
| 5,448,895 A * | 9/1995 | Coellner et al. | 62/94 |
| 5,542,968 A | 8/1996 | Belding | |

(Continued)

FOREIGN PATENT DOCUMENTS

| | | |
|---|---|---|
| EP | 2397787 | 12/2011 |
| GB | 2015384 | 9/1979 |

OTHER PUBLICATIONS

International Preliminary Report on Patentability for PCT/CA2012/000055, mailed Aug. 1, 2013.
AAONAIRE Energy Recovery Units Users Information Manual.

(Continued)

*Primary Examiner* — Mohammad M Ali
(74) *Attorney, Agent, or Firm* — Joseph M. Butscher; The Small Patent Law Group, LLC

(57) ABSTRACT

A heat pump system for conditioning regeneration air from a space is provided. The heat pump system is operable in a winter mode and/or a summer mode. The system includes an energy recovery module that receives and conditions air in a regeneration air channel. A pre-processing module is positioned downstream of the energy recovery module. The pre-processing module receives and heats air from the energy recovery module. A regeneration air heat exchanger is positioned downstream of the pre-processing module. The regeneration air heat exchanger receives and conditions air from the pre-processing module. The pre-processing module heats the air from the energy recovery module to increase an efficiency of the regeneration air heat exchanger.

60 Claims, 6 Drawing Sheets

(56) References Cited

U.S. PATENT DOCUMENTS

| | | | |
|---|---|---|---|
| 5,579,647 A * | 12/1996 | Calton et al. | 62/94 |
| 5,580,369 A | 12/1996 | Belding | |
| 5,638,900 A | 6/1997 | Lowenstein | |
| 5,650,221 A | 7/1997 | Belding | |
| 5,660,048 A | 8/1997 | Belding | |
| 5,685,897 A | 11/1997 | Belding | |
| 5,727,394 A | 3/1998 | Belding | |
| 5,758,508 A | 6/1998 | Belding | |
| 5,791,153 A | 8/1998 | Belding | |
| 5,791,157 A * | 8/1998 | Maeda | 62/483 |
| 5,826,434 A | 10/1998 | Belding | |
| 5,860,284 A | 1/1999 | Goland | |
| 5,890,372 A | 4/1999 | Belding | |
| 6,003,327 A | 12/1999 | Belding | |
| 6,018,953 A | 2/2000 | Belding | |
| 6,050,100 A | 4/2000 | Belding | |
| 6,079,481 A | 6/2000 | Lowenstein | |
| 6,176,101 B1 | 1/2001 | Lowenstein | |
| 6,247,323 B1 * | 6/2001 | Maeda | 62/271 |
| RE37,464 E * | 12/2001 | Meckler | 62/93 |
| 6,363,218 B1 | 3/2002 | Lowenstein | |
| 6,568,466 B2 | 5/2003 | Lowenstein | |
| 6,745,826 B2 | 6/2004 | Lowenstein | |
| 6,751,964 B2 * | 6/2004 | Fischer | 62/94 |
| 6,848,265 B2 | 2/2005 | Lowenstein | |
| 7,269,966 B2 | 9/2007 | Lowenstein | |
| 7,306,650 B2 | 12/2007 | Slayzak | |
| 7,966,841 B2 | 6/2011 | Lowenstein | |
| 2003/0136140 A1 * | 7/2003 | Maeda et al. | 62/271 |
| 2004/0000152 A1 * | 1/2004 | Fischer | 62/94 |
| 2004/0040172 A1 * | 3/2004 | Crawford | 34/330 |
| 2005/0050906 A1 * | 3/2005 | Dinnage et al. | 62/94 |
| 2006/0144226 A1 * | 7/2006 | Damrath et al. | 95/90 |
| 2007/0095519 A1 | 5/2007 | Hombucher | |
| 2009/0139254 A1 * | 6/2009 | Landry | 62/271 |
| 2010/0170655 A1 | 7/2010 | Kronval | |
| 2010/0319370 A1 | 12/2010 | Kozubal | |
| 2011/0308265 A1 | 12/2011 | Phannavong | |
| 2012/0125020 A1 | 5/2012 | Vandermeulen | |
| 2012/0125021 A1 | 5/2012 | Vandermeulen | |
| 2012/0125031 A1 | 5/2012 | Vandermeulen | |
| 2012/0125405 A1 | 5/2012 | Vandermeulen | |
| 2012/0125581 A1 | 5/2012 | Allen | |
| 2012/0131934 A1 | 5/2012 | Vandermeulen | |
| 2012/0131937 A1 | 5/2012 | Vandermeulen | |
| 2012/0131938 A1 | 5/2012 | Vandermeulen | |
| 2012/0131939 A1 | 5/2012 | Vandermeulen | |
| 2012/0131940 A1 | 5/2012 | Vandermeulen | |
| 2012/0132513 A1 | 5/2012 | Vandermeulen | |
| 2012/0186281 A1 | 7/2012 | Vandermeulen | |

OTHER PUBLICATIONS

"Performance analysis of a liquid desiccant and membrane contactor hybrid air-conditioning system," Bergero, Chiari, Energy and Buildings, 2010.

International Search Report and Written Opinion for counterpart PCT/CA2012/00055, mailed May 24, 2012.

* cited by examiner

|  | 302 | 328 | 330 | 332 |
|---|---|---|---|---|
| 304 — Outside Temp (P1) | | 35/33 | 17/15 | 5/3 |
| 306 — DX coil EAT (P2) | | 60.3/46.9 | 55.5/43 | 52.3/40.9 |
| 308 — RA Temp (P3) | | 70/25% | 70/25% | 70/25% |
| 310 — Desuperheater EAT (P4) | | 44.7/38.7 | 31.5/27.3 | 22.7/20.1 |
| 312 — Desuperheater LAT (P5) | | 57.87/45.38 | 46.15/36.1 | 40/30.5 |
| 314 — Condenser LAT (P6) | | 28.29/27.49 | 21.2/20.2 | 17.7/16.8 |
| 318 — Capacity (MBH) | | 237.9 | 184 | 181.6 |
| 316 — Supply Air D8 (*F) | | 87.7 | 76.7 | 73.2 |
| 320 — Power (W) | | 21599.88 | 19152 | 18602 |
| 322 — COP (W/W) | | 3.2 | 2.8 | 2.9 |
| 324 — Sat. suction temp (*F) | | 21.9 | 14 | 12.5 |
| 326 — Condensing temp (*F) | | 90.2 | 78.8 | 75.2 |

FIG. 3

|  | Without Desuperheater | With Desuperheater |
|---|---|---|
| Supply CFM | 8000 | 8000 |
| Condenser CFM | 14000 | 14000 |
| Outside Air Temp (P1) | 95/78 | 95/78 |
| DX Coil EAT (P2) | 80.8/68.5 | 80.8/68.5 |
| RA Temp (P3) | 75/63 | 75/63 |
| Desuperheater EAT (P4) |  | 91.68 |
| Condenser EAT (P5) | 91.68 | 97.65 |
| DX Cooling Capacity (MBH) | 388 | 399.7 |
| Power (W) | 32568.44 | 31400 |
| EER | 11.9 | 12.7 |
| Supply Air Temp (*F) | 52.6/52.6 | 51.94/51.94 |
| Sat. Suction Temp (*F) | 47.15 | 46.69 |
| Condensing Temp (*F) | 127.5 | 123.7 |

FIG. 7

HEAT PUMP SYSTEM HAVING A PRE-PROCESSING MODULE

BACKGROUND OF THE INVENTION

The subject matter described herein relates to a heat pump system and, more particularly, to a heat pump system for low temperature operation.

Existing air to air heat pumps generally include a supply air channel and a regeneration air channel. An energy exchange module extends between the supply air channel and the regeneration air channel. The energy exchange module transfers sensible and/or latent heat between the outside air in the supply air channel and the regeneration air in the regeneration air channel. The supply air channel and the regeneration air channel also include heat exchangers. The supply air channel includes a supply air heat exchanger and the regeneration air channel includes a regeneration air heat exchanger. The supply air heat exchanger and the regeneration air heat exchanger are in fluid communication through a refrigeration system to further transfer heat between the outside air and the regeneration air. In a winter mode, heat and/or moisture in the regeneration air is transferred to the outside air to generate heated and/or humidified supply air that is discharged from the supply air channel. During a summer mode, heat and moisture in the outside air is transferred to the regeneration air to generate cooled and dehumidified supply air that is discharged from the supply air channel.

However, conventional heat pump systems are not without their disadvantages. During winter modes, when the outside temperature has dropped below approximately 35° F./33° F., frost may form on the coils of the regeneration air heat exchanger. Accordingly, the heat pump system must be shut down so that the coils can be defrosted. During the time period that the heat pump system is shut down, the building incorporating the heat pump system must go without a heat source or requires an auxiliary heat source or recirculated air. Additionally, during summer modes, the regeneration air heat exchanger may be required to supply large amounts of heat to the regeneration air. As a result, an efficiency of the regeneration air heat exchanger may decrease substantially.

A need remains for a means to preheat the regeneration air during winter modes to prevent frost formation on the regeneration air heat exchanger at temperatures below approximately 35° F./33° F. Another needs remains to increase the efficiency of the regeneration air heat exchanger by lowering the condensation temperature during the summer mode using a pre-processing module in the regeneration air.

SUMMARY OF THE INVENTION

In one embodiment, a heat pump system for conditioning air in a space is provided. The system includes a supply air channel to receive outside air and discharge supply air into a space. A regeneration air channel is provided to receive regeneration air from the space and discharge exhaust air. The regeneration air channel and the supply air channel are separated by a partition. An energy recovery module is provided having a supply air side positioned in the supply air channel and a regeneration air side positioned in the regeneration air channel. The regeneration air side of the energy recovery module removes heat and moisture from the regeneration air in the regeneration air channel in a winter mode. A regeneration air heat exchanger is positioned in the regeneration air channel downstream from the regeneration air side of the energy recovery module. The regeneration air heat exchanger removes heat from the regeneration air in the winter mode. The regeneration air heat exchanger discharges the exhaust air. A pre-processing module is positioned in the regeneration air channel between the regeneration air side of the energy recovery module and the regeneration air heat exchanger. The pre-processing module heats the regeneration air from the energy recovery module in the winter mode to prevent frost from forming on the regeneration air heat exchanger.

In another embodiment, a heat pump system for conditioning air in a space is provided. The system comprising a supply air channel to receive outside air and discharge supply air into a space. A regeneration air channel is provided to receive regeneration air from the space and discharge exhaust air. The regeneration air channel and the supply air channel are separated by a partition. An energy recovery module is provided having a supply air side positioned in the supply air channel and a regeneration air side positioned in the regeneration air channel. The regeneration air side of the energy recovery module heats and humidifies the regeneration air in the regeneration air channel in a summer mode. A regeneration air heat exchanger is positioned in the regeneration air channel downstream from the regeneration air side of the energy recovery module. The regeneration air heat exchanger heats the regeneration air in the summer mode. The regeneration air heat exchanger discharges the exhaust air. A pre-processing module is positioned in the regeneration air channel between the regeneration air side of the energy recovery module and the regeneration air heat exchanger. The pre-processing module heats the regeneration air from the energy recovery module in the summer mode to lower a condensation temperature and increase an efficiency of the regeneration air heat exchanger.

In another embodiment, a heat pump system for conditioning air in a space is provided. The system includes a supply air channel to receive outside air and discharge supply air into a space. A regeneration air channel is provided to receive regeneration air from the space and discharge exhaust air. The regeneration air channel and the supply air channel are separated by a partition. A supply air heat exchanger is positioned in the supply air channel to condition the outside air in the supply air channel. A regeneration air heat exchanger is positioned in the regeneration air channel to condition the regeneration air in the regeneration air channel. Heat is transferred between the regeneration air heat exchanger and the supply air heat exchanger. A pre-processing module is positioned in the regeneration air channel upstream from the regeneration air heat exchanger. The pre-processing module heats the regeneration air in the regeneration air channel.

In another embodiment, a method for conditioning air in a space is provided. The method includes positioning a supply air channel adjacent to a regeneration air channel. The regeneration air channel and the supply air channel are separated by a partition. The supply air channel receives outside air and discharges supply air into a space. The regeneration air channel receives regeneration air from the space and discharges exhaust air. A supply air heat exchanger is positioned in the supply air channel to condition the outside air in the supply air channel. A regeneration air heat exchanger is positioned in the regeneration air channel to condition the regeneration air in the regeneration air channel. Heat is transferred between the regeneration air heat exchanger and the supply air heat exchanger. A pre-processing module is positioned in the regeneration air channel upstream from the regeneration air heat exchanger. The regeneration air is heated in the regeneration air channel with the pre-processing module.

In another embodiment, a method conditioning air in a space is provided. The method includes positioning a supply air channel adjacent to a regeneration air channel. The regeneration air channel and the supply air channel are separated by a partition. The supply air channel receives outside air and discharges supply air into a space. The regeneration air channel receives regeneration air from the space and discharges exhaust air. A supply air side of an energy recovery module is positioned in the supply air channel. A regeneration air side of the energy recovery module is positioned in the regeneration air channel. The energy recovery module transfers heat and moisture between the regeneration air and the outside air. A regeneration air heat exchanger is positioned in the regeneration air channel downstream from the regeneration air side of the energy recovery module. The regeneration air is conditioned with the regeneration air heat exchanger. A pre-processing module is positioned in the regeneration air channel between the regeneration air side of the energy recovery module and the regeneration air heat exchanger. The regeneration air in the regeneration air channel is heated with the pre-processing module.

BRIEF DESCRIPTION OF THE DRAWINGS

FIG. 3 is a table illustrating the performance of the heat pump system shown in FIG. 1 while operating in the winter mode.

FIG. 7 is a table illustrating the performance of the heat pump system shown in FIG. 5 while operating in the summer mode.

DETAILED DESCRIPTION OF THE INVENTION

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
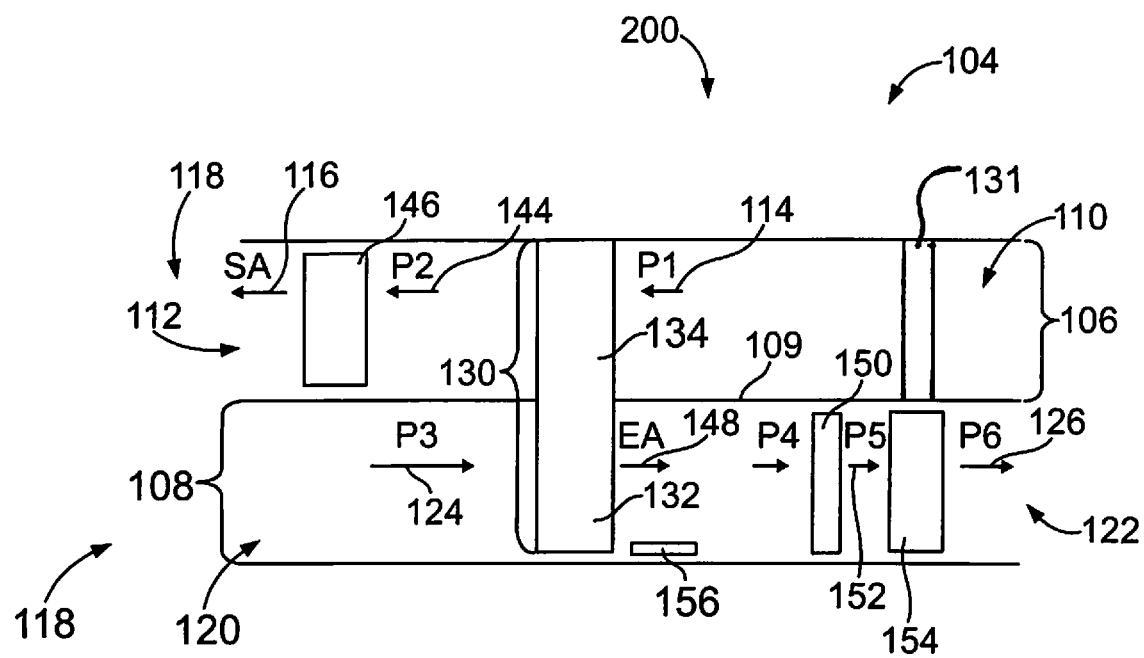
FIG. 1 is a schematic diagram of a heat pump system formed in accordance with an embodiment and operating in a winter mode.

FIG. 1 is a schematic diagram of a heat pump system 104 formed in accordance with an embodiment and operating in a winter mode 200. The heat pump system 104 is in fluid communication with a refrigerant system 102 (shown in FIG. 2). The heat pump system 104 is configured to exchange sensible and latent heat between a supply air channel 106 and a regeneration air channel 108. In one embodiment, the heat pump system 104 may be utilized to transfer only sensible heat. The supply air channel 106 is positioned adjacent to the regeneration air channel 108. The supply air channel 106 and the regeneration air channel 108 are separated by a partition 109. The supply air channel 106 extends between an inlet 110 and an outlet 112. The inlet 110 receives outside air 114. The outlet 112 discharges supply air 116 into a space 118. The space 118 may be a building, room, enclosed structure, or the like. The regeneration air channel 108 includes an inlet 120 and an outlet 122. The inlet 120 receives regeneration air 124. The regeneration air 124 may include return air from the space 118. The outlet discharges exhaust air 126 into the outside atmosphere.

An energy recovery module 130 extends between the regeneration air channel 108 and the supply air channel 106. In one embodiment, the heat pump system 104 may be an air to air heat pump that does not include the energy recovery module 130. The energy recovery module 130 includes a regeneration air side 132 and a supply air side 134. The regeneration air side 132 is positioned in the regeneration air channel 108. The supply air side 134 is positioned in the supply air channel 106. The energy recovery module 130 transfers sensible and latent heat between the regeneration air side 132 and the supply air side 134. The energy recovery module 130 transfers sensible and latent heat between the supply air channel 106 and the regeneration air channel 108. In one embodiment, the energy recovery module 130 may be a plate-type heat exchanger, an energy recovery wheel, heat pipe, enthalpy pump, or the like.

In one embodiment, the supply air channel 106 may include a preheater 131. It should be noted that the preheater 131 is an optional component that may be excluded from the heat pump system 104. The preheater 131 may be positioned upstream from the supply air side 134 of the energy recovery module 130. In one embodiment, the preheater 131 receives and heats the outside air 114 to generate heated air. Optionally, the outside air 114 flows directly to the supply air side 134 of the energy recovery module 130. The present embodiment will be described with respect to a heat pump system 104 that excludes the preheater 131. Accordingly, the supply air side 134 of the energy recovery module receives the outside air 114. The energy recovery module 130 transfers heat and moisture between the outside air 114 in the supply air side 134 and the regeneration air 124 in the regeneration air side 132 to generate pre-conditioned outside air 144. The supply air stream includes a supply air heat exchanger 146 positioned downstream from the supply air side 134 of the energy recovery module 130. The supply air heat exchanger 146 receives the pre-conditioned outside air 144 and generates the supply air 116.

In the regeneration air channel 108, the regeneration air side 132 of the energy recovery module 130 receives the regeneration air 124. The energy recovery module 130 transfers sensible and latent heat between the regeneration air 124 in the regeneration air side 132 and the outside air 114 in supply air side 134 to generate pre-conditioned regeneration air 148. A pre-processing module 150 is positioned downstream from the regeneration air side 132 of the energy recovery module 130. In one embodiment, the pre-processing module 150 may be a heat exchanger or the like. The pre-processing module 150 receives and heats the pre-conditioned regeneration air 148 to generate pre-heated air 152. A regeneration air heat exchanger 154 is positioned downstream from the pre-processing module 150. In one embodiment, the pre-processing module 150 may be mounted to the regeneration air heat exchanger 154 within the same frame or casing. The regeneration air heat exchanger 154 receives the pre-heated air 152 and generates the exhaust air 126. The regeneration air heat exchanger 154 is fluidly coupled to the supply air heat exchanger 146. The regeneration air heat exchanger 154 and the supply air heat exchanger 146 transfer heat between the pre-heated air 152 and the pre-conditioned outside air 144.

The regeneration air channel 108 also includes a damper 156 positioned between the regeneration air side 132 of the energy recovery module 130 and the pre-processing module 150. The damper 156 may be opened to allow outside air to mix with the pre-conditioned regeneration air 148 prior to entering the pre-processing module 150.

In one embodiment, in the winter mode 200, the heat pump system 104 is capable of operating at temperatures as low as approximately 5° F. In other embodiments, the heat pump system 104 may be capable of operating at temperatures below approximately 5° F. In the winter mode 200, the regeneration air 124 includes warm humidified air and the outside air 114 includes cool dehumidified air.

The outside air 114 enters the inlet 110 of the supply air channel 106. The outside air 114 is channeled to the supply air side 134 of the energy recovery module 130. In one embodiment, the outside air 114 is first heated by a preheater 131 prior to entering the supply air side 134 of the energy recovery module 130. In the supply air side 134 of the energy recovery module 130, the supply air 116 receives heat and moisture from the regeneration air 124 flowing through the regeneration air side 132 of the energy recovery module 130. The energy recovery module 130 generates warm humidified pre-conditioned outside air 144. The pre-conditioned outside air 144 flows downstream to the supply air heat exchanger 146. In the winter mode 200, the supply air heat exchanger 146 operates as a condenser to heat the pre-conditioned outside air 144. The supply air heat exchanger 146 receives heat from the regeneration air heat exchanger 154. The pre-conditioned outside air 144 receives heat from the supply air heat exchanger 146 to generate warm humidified supply air 116. The warm humidified supply air 116 is discharged into the space 118.

The regeneration air channel 108 receives the warm humidified regeneration air 124 from the space 118. The regeneration air 124 flows downstream to the regeneration air side 132 of the energy recovery module 130. The regeneration air side 132 of the energy recovery module 130 removes heat and moisture from the regeneration air 124. The heat and moisture is transferred to the supply air side 134 of the energy recovery module 130 to heat and humidify the outside air 114. The regeneration air side 132 of the energy recovery module 130 generates cool dehumidified pre-conditioned regeneration air 148. In the winter mode 200, the damper 156 is closed so that the pre-conditioned regeneration air 148 is not mixed with outside air. The pre-conditioned regeneration air 148 is channeled to the pre-processing module 150. In one embodiment, the pre-conditioned regeneration air 148 is channeled to the pre-processing module 150 when the outside air 114 has a temperature less than approximately 35° F. The pre-processing module 150 heats the pre-conditioned regeneration air 148 to generate pre-heated air 152. In one embodiment, when the heat pump system 104 is receiving outside air 114 that has a temperature greater than 35° F., the pre-processing module 150 may be shut-off so that the pre-conditioned regeneration air 148 flows through the pre-processing module 150 unchanged. In an alternative embodiment, the pre-conditioned air 148 by-passes the pre-processing module 150.

The pre-heated air 152 is channeled downstream to the regeneration air heat exchanger 154. In the winter mode 200, the regeneration air heat exchanger 154 operates as an evaporator to cool and dehumidify the pre-heated air 152 and generate cool dehumidified exhaust air 126. The cool dehumidified exhaust air 126 is discharged into the atmosphere. In an exemplary embodiment, the pre-processing module 150 heats the pre-conditioned regeneration air 148 to prevent frost formation on the regeneration air heat exchanger 154 during the winter mode 200. In particular, when operating the heat pump system 104 at outside air temperatures below approximately 35° F., frost may form on the regeneration air heat exchanger 154 as the regeneration air heat exchanger 154 generates the cool dehumidified exhaust air 126. Heating the pre-conditioned regeneration air 148 allows the regeneration air heat exchanger 154 to generate cool dehumidified exhaust air 126 that does not exceed a saturation point of the air. By preventing saturation of the cool dehumidified exhaust air 126, condensation does not form on the coils of the regeneration air heat exchanger 154. Accordingly, frost formation on the coils of the regeneration air heat exchanger 154 may be prevented by pre-heating the pre-conditioned regeneration air 148.

Figure 2:
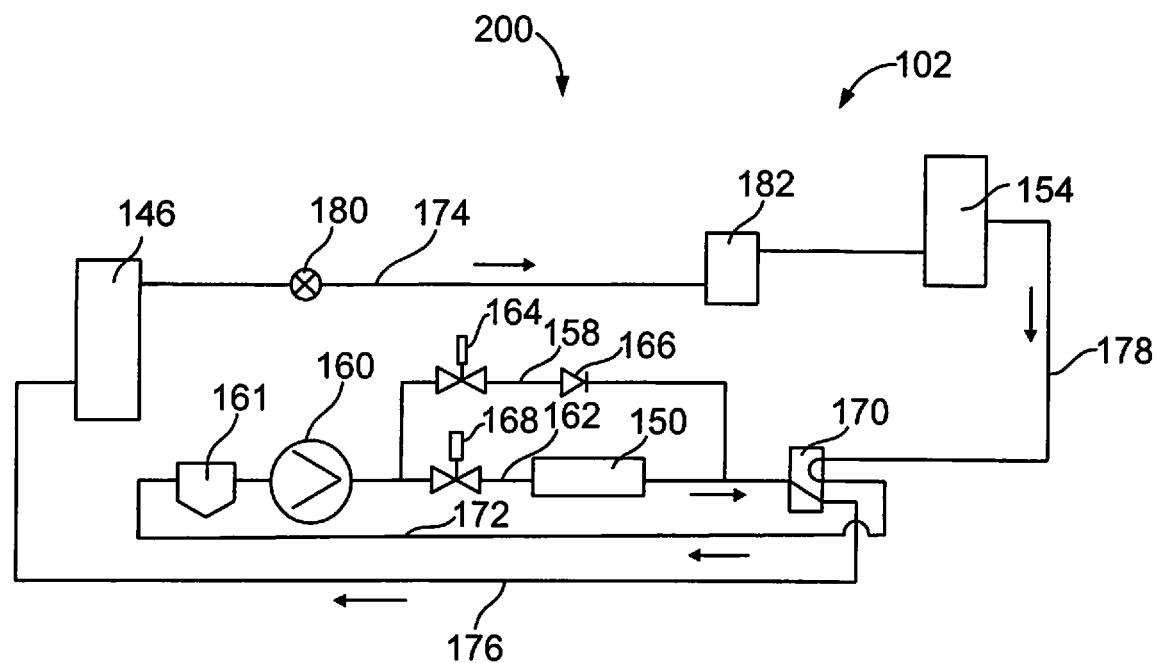
FIG. 2 is a schematic diagram of a refrigerant system formed in accordance with an embodiment and operating in the winter mode.

FIG. 2 is a schematic diagram of a refrigerant system 102 formed in accordance with an embodiment and operating in the winter mode 200. The refrigerant system 102 includes a refrigerant flowing therethrough. The refrigerant system 102 includes a compressor 160 that conditions the refrigerant to achieve the required temperature and pressure conditions for the refrigerant system 102. A suction accumulator 161 is positioned upstream of the condenser to avoid a flow of liquid refrigerant into the compressor 160. In one embodiment, a suction accumulator may be positioned upstream of the compressor 160 to avoid a flow of liquid refrigerant into the compressor 160. A pre-processing circuit 162 and a bypass circuit 158 are positioned downstream of, and fluidly coupled to, the compressor 160. A bypass valve 164 and a check valve 166 are positioned within the bypass circuit 158. In one embodiment, a check valve may be positioned at the pre-processing module 150 outlet to avoid refrigerant migration. A pre-processing valve 168 and the pre-processing module 150 are positioned in the pre-processing circuit 162 so that the pre-processing module 150 is fluidly coupled to the compressor 160. In one embodiment, an additional refrigeration system control valve may be positioned downstream of the module 150. The bypass circuit 158 and the pre-processing circuit 162 are in fluid communication a four-way valve 170. An accumulator circuit 172 is in fluid communication between the four-way valve 170 and the suction accumulator 161.

A heat exchange circuit 174 is in fluid communication with the four way valve 170 and the heat pump system 104. The heat exchange circuit 174 includes a first end 176 and a second end 178. The first end 176 and the second end 178 of the heat exchange circuit 174 are both in fluid communication with the four-way valve so that the heat exchange circuit 174 both receives and returns refrigerant to the four-way valve 170. The supply air heat exchanger 146 and the regeneration air heat exchanger 154 are positioned within the heat exchange circuit 174. A valve 180 and a receiver 182 are positioned within the heat exchange circuit 174 between the supply air heat exchanger 146 and the regeneration air heat exchanger 154. It should be noted that the components illustrated in the refrigerant system 102 are exemplary only and the refrigerant system 102 may include other components.

The pre-processing module 150 is coupled in fluid communication with both the supply air heat exchanger 146 and the regeneration air heat exchanger 154. The pre-processing module 150 is fluidly coupled between the supply air heat exchanger 146 and the regeneration air heat exchanger 154 in a common refrigerant path through the refrigerant system 102.

In the winter mode 200, refrigerant in the compressor 160 flows downstream to at least one of the bypass circuit 158 or the pre-processing circuit 162. The bypass valve 164 and the pre-processing valve 168 are controlled based on a refrigerant requirement of the pre-processing module 150. For example, when operating at higher outside temperatures, the pre-processing module 150 requires less refrigerant flow. Accordingly, the bypass valve 164 and the pre-processing valve 168 are controlled to channel more refrigerant through the bypass circuit 158. As the outside temperature decreases, the pre-processing module 150 requires more refrigerant flow. Accordingly, the bypass valve 164 and the pre-processing valve 168 are controlled to channel more refrigerant through the pre-processing circuit 162. In one embodiment, when the outside temperature reaches approximately 5° F., the bypass valve 164 may be closed and the pre-processing valve 168 may be fully opened so that all of the refrigerant flows through the pre-processing circuit 162 and the pre-processing module 150. In one embodiment, an additional refrigerant flow control device may be positioned downstream of the module 150. The pre-processing module 150 heats the pre-conditioned regeneration air 148 in the regeneration air channel 108. The refrigerant in the bypass circuit 158 and the pre-processing circuit 162 then flows downstream to the four-way valve 170.

In the winter mode 200, the four-way valve 170 couples the bypass circuit 158 and the pre-processing circuit 162 in fluid communication with the first end 176. The refrigerant flows through the circuit 176 to the supply air heat exchanger 146. The refrigerant in the supply air heat exchanger 146 provides heat to the pre-conditioned outside air 144. Than the refrigerant flows through the circuit 174 to the regeneration air heat exchanger 154. The regeneration air heat exchanger 154 receives heat from the pre-heated air 152. The refrigerant then flows downstream to the four-way valve 170. In the winter mode 200, the four-way valve 170 couples the second end 178 of the heat exchange circuit 174 to the accumulator circuit 172 to return the refrigerant from the heat exchange circuit 174 to the compressor 160.

FIG. 3 is a table 300 illustrating an exemplary embodiment of the performance of the heat pump system 104 while operating in the winter mode 200. The table 300 illustrates three operating conditions of the heat pump system 104. The operating conditions are illustrated with respect to a plurality of performance factors 302. The performance factors 302 include the temperature 304 of the outside air 114, the temperature 306 of the pre-conditioned outside air 144, the temperature 308 of the regeneration air 124, the temperature 310 of the pre-conditioned regeneration air 148, the temperature 312 of the pre-heated air 152, the temperature 314 of the exhaust air 126, and the temperature 316 of the supply air 116. The performance factors 302 also include a capacity 318 of the heat pump system 104, a compressor power consumption 320 of the heat pump system 104, a performance 322 of the heat pump system 104, a refrigerant saturation suction temperature 324, and a refrigerant condensing temperature 326.

In a first operating condition 328, the heat pump system 104 receives outside air 114 having a temperature 304 of 35° F. dry bulb and 33° F. wet bulb. The energy recovery module 130 heats and humidifies the outside air to generate pre-conditioned outside air 144 having a temperature 306 of 60.3° F. dry bulb and 46.9° F. wet bulb. The supply air heat exchanger 146 heats the pre-conditioned outside air 144 to generate supply air 116 having a temperature 316 of 87.7° F. dry bulb. In the first operating condition 328, the heat pump system 104 receives regeneration air 124 having a temperature 308 of 70° F. dry bulb with 25% humidity. The energy recovery module 130 cools and dehumidifies the regeneration air 124 to generate pre-conditioned regeneration air 148 having a temperature 310 of 44.7° F. dry bulb and 38.7° F. wet bulb. The pre-processing module 150 heats the pre-conditioned regeneration air 148 to generate pre-heated air 152 having a temperature 312 of 57.87° F. dry bulb and 45.38° F. wet bulb. The regeneration air heat exchanger 154 cools the pre-heated air 152 to generate exhaust air 126 having a temperature 314 of 28.29° F. dry bulb and 27.49° F. wet bulb.

During the first operating condition 328, the heat pump system 104 has a capacity 318 of 237.9 MBH and a compressor power consumption 320 of 21599.88 W. The coefficient of performance 322 for the heat pump system 104 is 3.2. A saturation suction temperature 324 and a condensing temperature 326 for the heat pump system 104 are 21.9° F. and 90.2° F., respectively.

In a second operating condition 330, the heat pump system 104 receives outside air 114 having a temperature 304 of 17° F. dry bulb and 15° F. wet bulb. The energy recovery module 130 heats and humidifies the outside air to generate pre-conditioned outside air 144 having a temperature 306 of 55.5° F. dry bulb and 43° F. wet bulb. The supply air heat exchanger 146 heats the pre-conditioned outside air 144 to generate supply air 116 having a temperature 316 of 76.7° F. dry bulb. In the second operating condition 330, the heat pump system 104 receives regeneration air 124 having a temperature 308 of 70° F. dry bulb with 25% humidity. The energy recovery module 130 cools and dehumidifies the regeneration air 124 to generate pre-conditioned regeneration air 148 having a temperature 310 of 31.5° F. dry bulb and 27.3° F. wet bulb. The pre-processing module 150 heats the pre-conditioned regeneration air 148 to generate pre-heated air 152 having a temperature 312 of 46.15° F. dry bulb and 36.1° F. wet bulb. The regeneration air heat exchanger 154 cools the pre-heated air 152 to generate exhaust air 126 having a temperature 314 of 21.2° F. dry bulb and 20.2° F. wet bulb.

During the second operating condition 330, the heat pump system 104 has a capacity 318 of 184 MBH and a compressor power consumption 320 of 19152 W. The coefficient of performance 322 for the heat pump system 104 is 2.8. A refrigerant saturation suction temperature 324 and a refrigerant condensing temperature 326 for the heat pump system 104 are 14° F. and 78.8° F., respectively.

In a third operating condition 332, the heat pump system 104 receives outside air 114 having a temperature 304 of 5° F. dry bulb and 3° F. wet bulb. The energy recovery module 130 heats and humidifies the outside air to generate pre-conditioned outside air 144 having a temperature 306 of 52.3° F. dry bulb and 40.9° F. wet bulb. The supply air heat exchanger 146 heats the pre-conditioned outside air 144 to generate supply air 116 having a temperature 316 of 73.2° F. dry bulb. In the third operating condition 332, the heat pump system 104 receives regeneration air 124 having a temperature 308 of 70° F. dry bulb with 25% humidity. The energy recovery module 130 cools and dehumidifies the regeneration air 124 to generate pre-conditioned regeneration air 148 having a temperature 310 of 22.7° F. dry bulb and 20.1° F. wet bulb. The pre-processing module 150 heats the pre-conditioned regeneration air 148 to generate pre-heated air 152 having a temperature 312 of 40° F. dry bulb and 30.5° F. wet bulb. The regeneration air heat exchanger 154 cools the pre-heated air 152 to generate exhaust air 126 having a temperature 314 of 17.7° F. dry bulb and 16.8° F. wet bulb.

During the third operating condition 332, the heat pump system 104 has a capacity 318 of 181.6 MBH and a compressor power consumption 320 of 18602 W. The coefficient of performance 322 for the heat pump system 104 is 2.9. A saturation suction temperature 324 and a condensing temperature 326 for the heat pump system 104 are 12.5° F. and 75.2° F., respectively.

Figure 4:
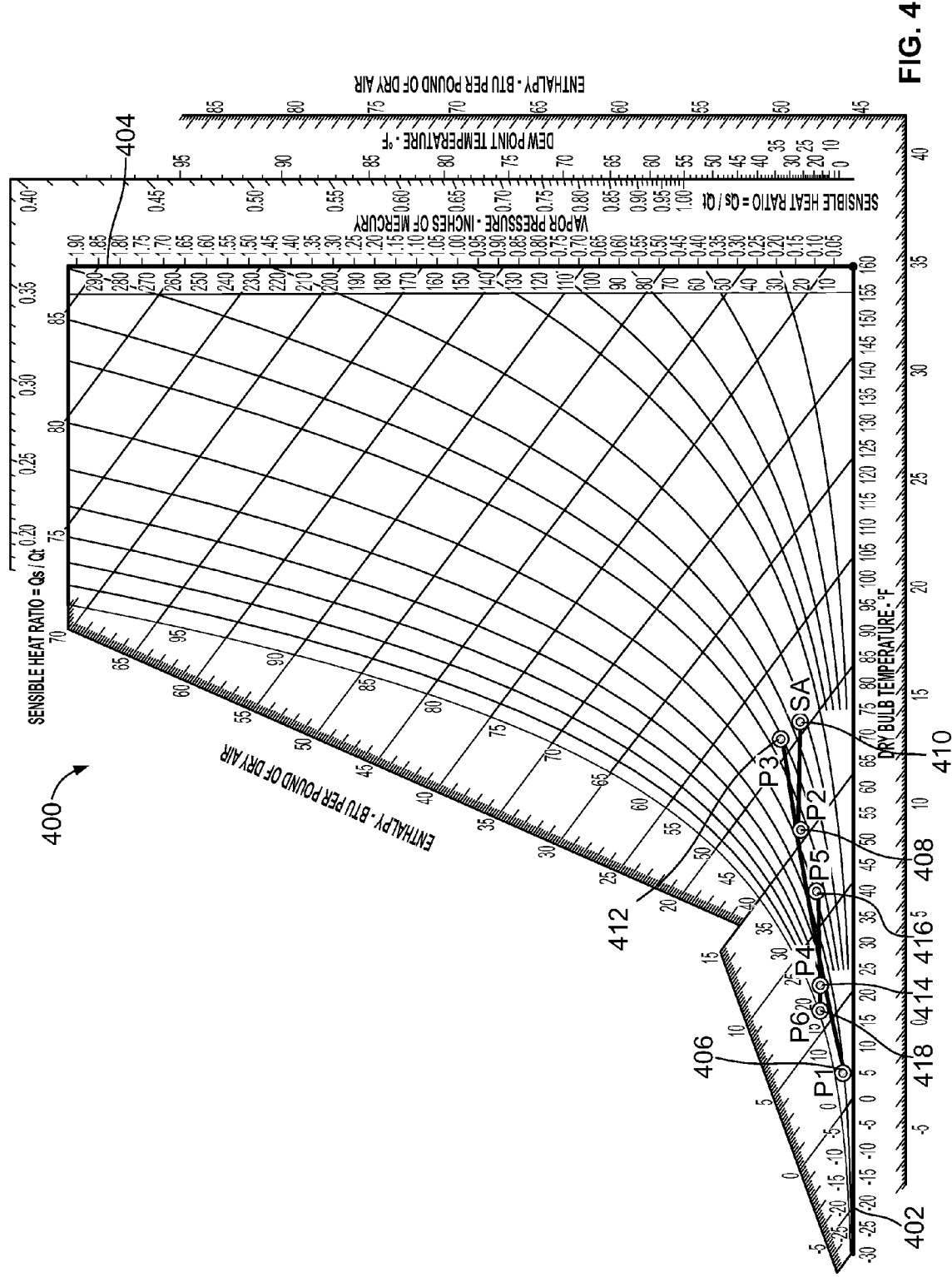
FIG. 4 is a psychrometric chart illustrating the performance of the heat pump shown in FIG. 1 while operating in the winter mode.

FIG. 4 is a psychrometric chart 400 illustrating the performance of the heat pump 104 while operating in the winter mode 200. The chart 400 illustrates the performance of the heat pump 104 when the outside air is 5° F. The chart 400 includes an x-axis 402 representing the dry-bulb temperature of the air in ° F. A y-axis 404 represents a humidity ratio of the air in grains of moisture per pounds of dry air.

The heat pump system 104 receives outside air 114 at point 406 having a temperature of 5° F. and a humidity ratio of 3.7. The energy recovery module 130 heats and humidifies the outside air to generate pre-conditioned outside air 144 at point 408 having a temperature of 52.3° F. and a humidity ratio of 19.8. The supply air heat exchanger 146 heats the pre-conditioned outside air 144 to generate supply air 116 at point 410 having a temperature of 73.2° F. and a humidity ratio of 19.8. The heat pump system 104 receives regeneration air 124 at point 412 having a temperature of 70° F. and a humidity ratio of 25. The energy recovery module 130 cools and dehumidifies the regeneration air 124 to generate pre-conditioned regeneration air 148 at point 414 having a temperature of 22.7° F. and a humidity ratio of 11.6. The pre-processing module 150 heats the pre-conditioned regeneration air 148 to generate pre-heated air 152 at point 416 having a temperature of 40° F. and a humidity ratio of 11.7. The regeneration air heat exchanger 154 cools the pre-heated air 152 to generate exhaust air 126 at point 418 having a temperature of 17.7° F. and a humidity ratio of 15.

Figure 5:
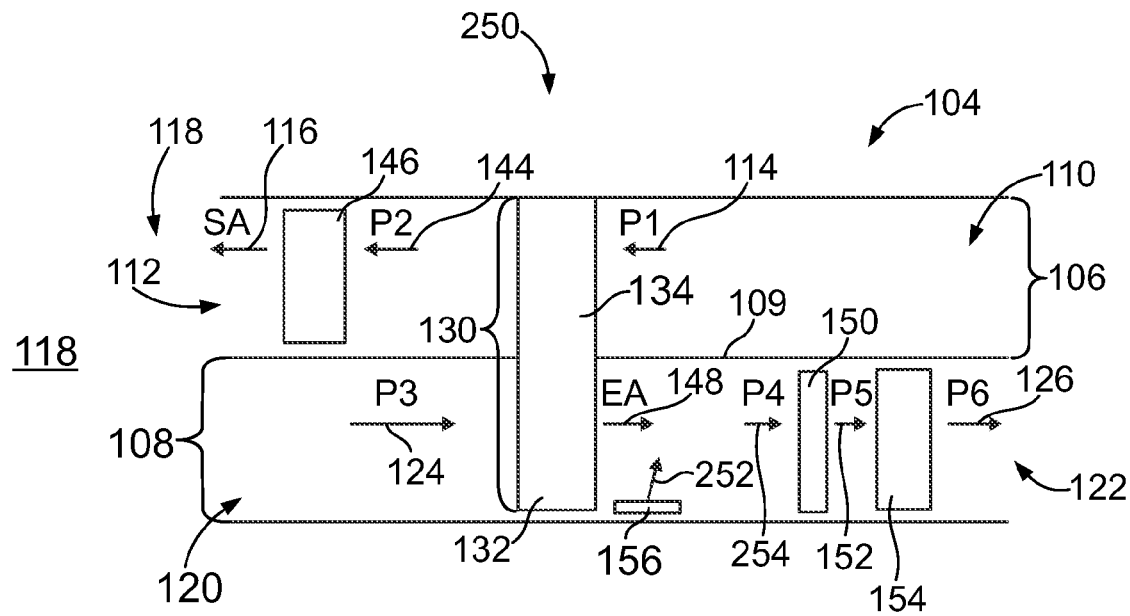
FIG. 5 is a schematic diagram of the heat pump system shown in FIG. 1 and operating in a summer mode.

FIG. 5 is a schematic diagram of the heat pump system 104 operating in a summer mode 250. In the summer mode 250, the regeneration air 124 includes cool dehumidified air and the outside air 114 includes warm humidified air.

The outside air 114 enters the inlet 110 of the supply air channel 106. The outside air 114 is channeled to the supply air side 134 of the energy recovery module 130. In the supply air side 134 of the energy recovery module 130, heat and moisture are removed from the supply air 116 and transferred to the regeneration air 124 flowing through the regeneration air side 132 of the energy recovery module 130. The energy recovery module 130 generates cool dehumidified pre-conditioned outside air 144. The pre-conditioned outside air 144 flows downstream to supply air heat exchanger 146. In the summer mode 250, the supply air heat exchanger 146 operates as an evaporator to cool the pre-conditioned outside air 144. The supply air heat exchanger 146 removes heat from the pre-conditioned outside air 144 and transfers the heat to the regeneration air heat exchanger 154. The supply air heat exchanger 146 to generates cool dehumidified supply air 116 that is discharged into the space 118.

The regeneration air channel 108 receives the cool dehumidified regeneration air 124 from the space 118. The regeneration air 124 flows downstream to the regeneration air side 132 of the energy recovery module 130. The cool dehumidified regeneration air 124 receives heat and moisture from the regeneration air side 132 of the energy recovery module 130. The heat and moisture is transferred from the supply air side 134 of the energy recovery module 130 to heat and humidify the cool dehumidified regeneration air 124. The regeneration air side 132 of the energy recovery module 130 generates warm humidified pre-conditioned regeneration air 148. In the summer mode 250, the damper 156 is opened so that the pre-conditioned regeneration air 148 is mixed with outside air 252 to generate mixed air 254. In other embodiments, the damper 156 may be modulated in the summer mode to control a refrigerant condensation temperature. The outside air 252 is added to the warm humidified pre-conditioned regeneration air 148 to control the refrigeration pressure in the refrigeration system 102. In one embodiment, controlling the refrigeration system pressure lowers a condensation temperature to improve the efficiency of the heat pump system 104.

The mixed air 254 is channeled to the pre-processing module 150. In one embodiment, the mixed air 254 may by-pass the pre-processing module 150. In one embodiment, the pre-processing module 150 and the regeneration air heat exchanger 154 may by-passed during a controlled free cooling mode, wherein the refrigerant system 102 is not operating. The pre-processing module 150 heats the mixed air 254 to generate the pre-heated air 152. The pre-heated air 152 is channeled downstream to the regeneration air heat exchanger 154. In the summer mode 250, the regeneration air heat exchanger 154 operates as a condenser to heat the pre-heated air 152 and generate warm exhaust air 126. The warm exhaust air 126 is discharged into the atmosphere. In an exemplary embodiment, the pre-processing module 150 heats the mixed air 254 to improve an efficiency of the regeneration air heat exchanger 154. Because the mixed air 254 is pre-heated by the pre-processing module 150, the regeneration air heat exchanger 154 requires a lower condensation temperature in the refrigeration system 102. A lower condensation temperature will improve the efficiency of the heat pump system 104.

Figure 6:
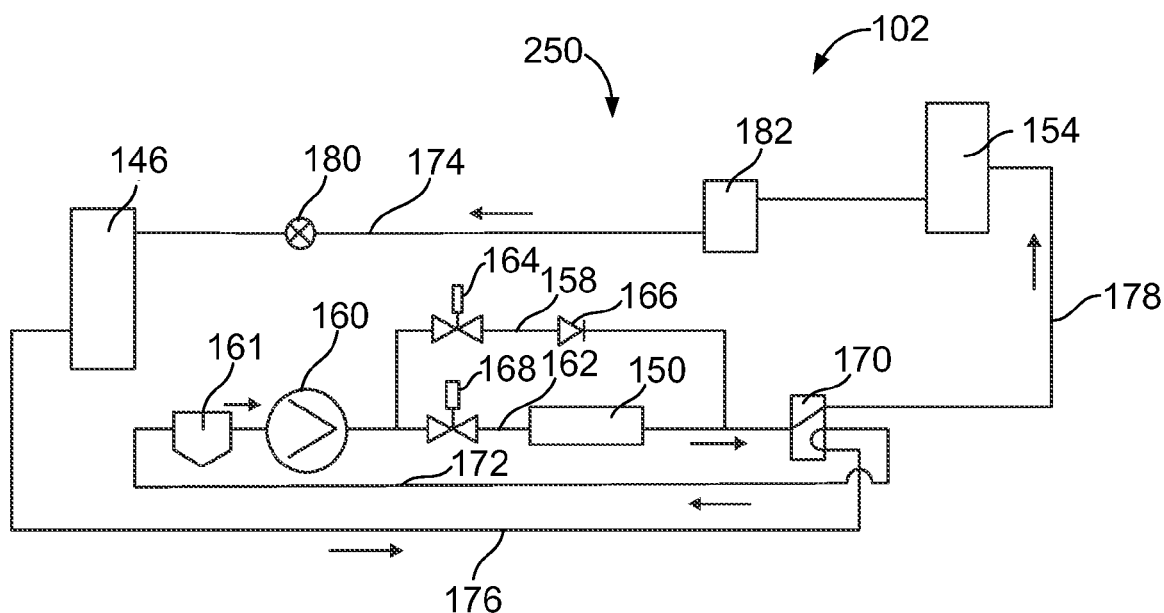
FIG. 6 is a schematic diagram of the refrigerant system shown in FIG. 2 and operating in the summer mode.

FIG. 6 is a schematic diagram of the refrigerant system 102 operating in the summer mode 250. In the summer mode 250, the bypass valve 164 is entirely closed and the pre-processing valve 168 is entirely opened or modulated. The refrigerant in the compressor 160 flows downstream to the pre-processing circuit 162 and the pre-processing module 150. The pre-processing module 150 heats the pre-conditioned regeneration air 148 in the regeneration air channel 108. The refrigerant in the pre-processing module 150 then flows downstream to the four-way valve 170.

In the summer mode 250, the four-way valve 170 couples the pre-processing circuit 162 in fluid communication with the second end 178 of the heat exchange circuit 174. The refrigerant flow in the regeneration air heat exchanger 154 transfers heat to the pre-heated air 152. The refrigerant in the supply air heat exchanger 146 receives heat from the pre-conditioned outside air 144. The refrigerant then flows downstream to the four-way valve 170. In the summer mode 250, the four-way valve 170 couples the first end 176 of the heat exchange circuit 174 to the accumulator circuit 172 to return the refrigerant from the heat exchange circuit 174 to the compressor 160.

FIG. 7 is a table 500 illustrating the performance of the heat pump system 104 while operating in the summer mode 250. The table 500 illustrates two operating conditions of the heat pump system 104. The operating conditions are illustrated with respect to a plurality of performance factors 502. The performance factors 502 include the temperature 504 of the outside air 114, the temperature 506 of the pre-conditioned outside air 144, the temperature 508 of the regeneration air 124, the temperature 510 of the pre-conditioned regeneration air 148, the temperature 512 of the pre-heated air 152, and the temperature 516 of the supply air 116. The performance factors 302 also include a supply air flow capacity 518, a condenser air flow capacity 520, a compressor power consumption 522, an energy efficiency ratio 524 of the compressor 160, a refrigerant saturation suction temperature 526, a refrigerant condensing temperature 528, and a cooling capacity 529 of the supply air heat exchanger 146.

In a first operating condition 530, the heat pump system 104 does not include the pre-processing module 150. The heat pump system 104 receives outside air 114 having a temperature 504 of 95° F. dry bulb and 78° F. wet bulb. The energy recovery module 130 cools and dehumidifies the outside air 114 to generate pre-conditioned outside air 144 having a temperature 506 of 80.8° F. dry bulb and 68.5° F. wet bulb. The supply air heat exchanger 146 cools the pre-conditioned outside air 144 to generate supply air 116 having a temperature 516 of 52.6° F. dry bulb and 52.6° F. wet bulb. In the first operating condition 530, the heat pump system 104 receives regeneration air 124 having a temperature 508 of 75° F. dry bulb and 63° F. wet bulb. The energy recovery module 130 heats and humidifies the regeneration air 124 to generate pre-conditioned regeneration air 148 having a temperature 510 of 91.68° F. dry bulb. In the first operating condition 530, the heat pump system 104 does not include the pre-processing module 150. Accordingly, the temperature 512 of the pre-heated air 152 is the same as the temperature 510 of the pre-conditioned regeneration air 148, 91.68° F. dry bulb. The regeneration air heat exchanger 154 heats the pre-conditioned regeneration air 148.

During the first operating condition 530, the heat pump system 104 has a supply air flow capacity 518 and a condenser air flow capacity 520 of 8000 and 14000, respectively. A compressor power consumption 522 of the heat pump system 104 is 32568.44 W and an energy efficiency ratio 524 of the compressor 160 is 11.9. The saturation suction temperature 526 and the condensing temperature 528 of the heat pump system 104 are 47.15° F. and 127.5° F., respectively. The supply air heat exchanger 146 has a cooling capacity 529 of 388 MBH.

In a second operating condition 532, the heat pump system 104 includes the pre-processing module 150. The heat pump system 104 receives outside air 114 having a temperature 504 of 95° F. dry bulb and 78° F. wet bulb. The energy recovery module 130 cools and dehumidifies the outside air 114 to generate pre-conditioned outside air 144 having a temperature 506 of 80.8° F. dry bulb and 68.5° F. wet bulb. The supply air heat exchanger 146 cools the pre-conditioned outside air 144 to generate supply air 116 having a temperature 516 of 51.94° F. dry bulb and 51.94° F. wet bulb. In the second operating condition 532, the heat pump system 104 receives regeneration air 124 having a temperature 508 of 75° F. dry bulb and 63° F. wet bulb. The energy recovery module 130 heats and humidifies the regeneration air 124 to generate pre-conditioned regeneration air 148 having a temperature 510 of 91.68° F. dry bulb. The pre-processing module 150 heats the pre-conditioned regeneration air 148 to generate pre-heated air 152 having a temperature 512 of 97.65° F. dry bulb. The regeneration air heat exchanger 154 heats the pre-heated air 152.

During the second operating condition 532, the heat pump system 104 has a supply air flow capacity 518 and a condenser air flow capacity 520 of 8000 and 14000, respectively. A compressor power consumption 522 of the heat pump system 104 is 31400 W and an energy efficiency ratio 524 of the compressor 160 is 12.7. The saturation suction temperature 526 and the condensing temperature 528 of the heat pump system 104 are 46.69° F. and 123.7° F., respectively. The supply air heat exchanger 146 has a cooling capacity 529 of 399.7 MBH.

Figure 8:
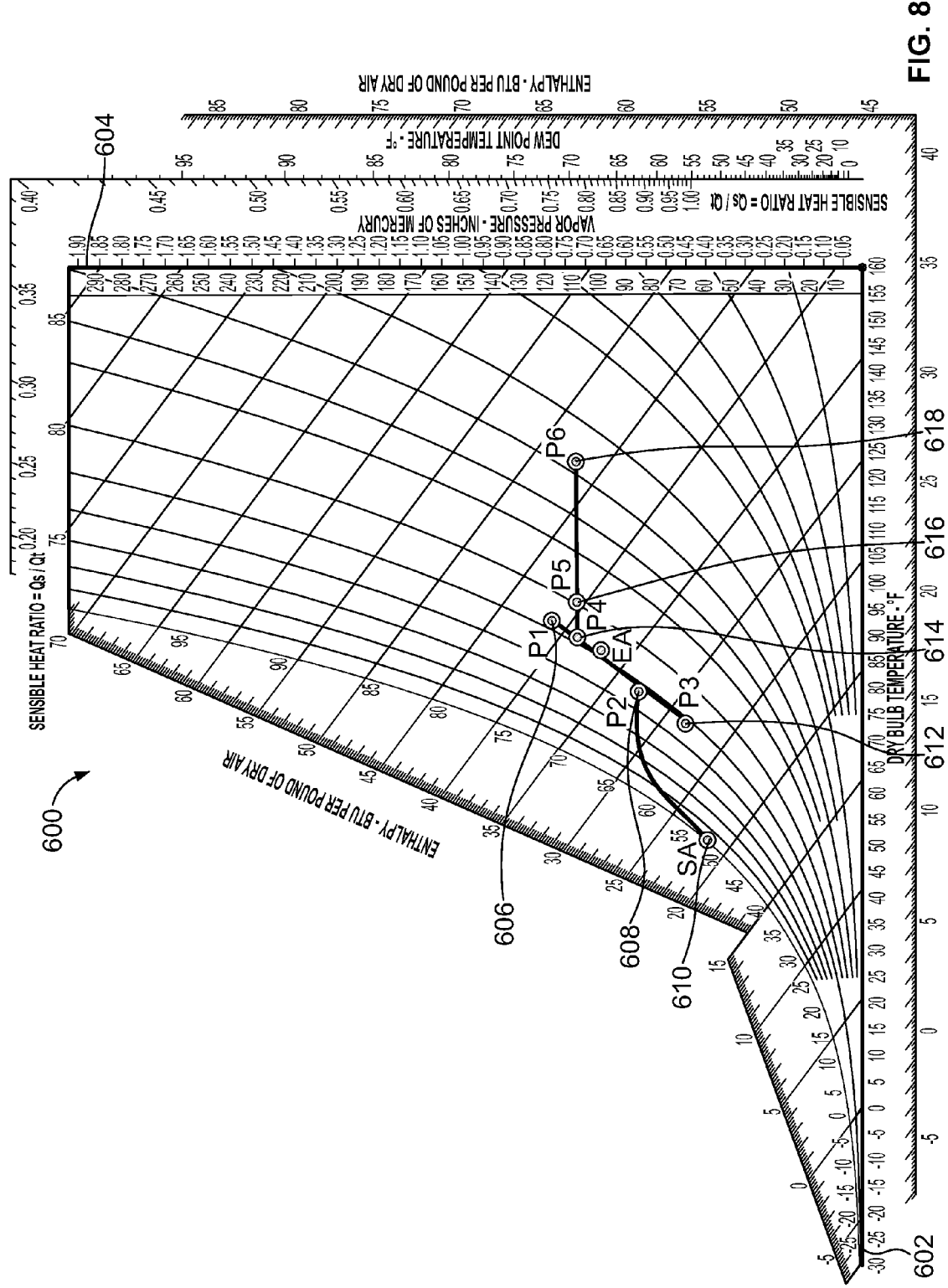
FIG. 8 is a psychrometric chart illustrating the performance of the heat pump shown in FIG. 5 while operating in the summer mode.

FIG. 8 is a psychrometric chart 600 illustrating the performance of the heat pump shown 104 while operating in the summer mode 250. The chart 600 illustrates the performance of the heat pump 104 when the outside air is 95° F. The chart 600 includes an x-axis 602 representing the dry-bulb temperature of the air in ° F. A y-axis 604 represents a humidity ratio of the air in grains of moisture per pounds of dry air.

The heat pump system 104 receives outside air 114 at point 606 having a temperature of 95° F. and a humidity ratio of 120. The energy recovery module 130 cools and dehumidifies the outside air 114 to generate pre-conditioned outside air 144 at point 608 having a temperature of 80.8° F. and a humidity ratio of 85. The supply air heat exchanger 146 cools the pre-conditioned outside air 144 to generate supply air 116 at point 610 having a temperature of 51.94° F. and a humidity ratio of 58.

The heat pump system 104 receives regeneration air 124 at point 612 having a temperature of 75° F. and a humidity ratio of 67. The energy recovery module 130 heats and humidifies the regeneration air 124 to generate pre-conditioned regeneration air 148 at point 614 having a temperature of 91.68° F. and a humidity ratio of 98. The pre-processing module 150 heats the mixed air including the outside air to generate pre-heated air 152 at point 616 having a temperature of 97.65° F. and a humidity ratio of 98. The regeneration air heat exchanger 154 heats the pre-heated air 152 to generate exhaust air 126 at point 618 having a temperature of 123.7 F and a humidity ratio of 98.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:
1. A heat pump system for conditioning air in a space, the system comprising:
 a supply air channel to receive air and discharge supply air into the space;

a regeneration air channel to receive regeneration air from the space and discharge exhaust air, the regeneration air channel and the supply air channel separated by a partition;

an energy recovery module having a supply air side positioned in the supply air channel and a regeneration air side positioned in the regeneration air channel, the regeneration air side of the energy recovery module removing heat and moisture from the regeneration air in the regeneration air channel in a winter mode;

a regeneration air heat exchanger positioned in the regeneration air channel downstream from the regeneration air side of the energy recovery module, the regeneration air heat exchanger removing heat from the regeneration air in the winter mode, the regeneration air heat exchanger discharging the exhaust air; and a pre-processing module positioned in the regeneration air channel between the regeneration air side of the energy recovery module and the regeneration air heat exchanger, the pre-processing module heating the regeneration air from the energy recovery module in the winter mode to prevent frost from forming on the regeneration air heat exchanger.

2. The heat pump system of claim 1, wherein the energy recovery module receives and conditions at least one of outside, ambient, mixed or return air.

3. The heat pump system of claim 1, wherein the pre-processing module and the regeneration air heat exchanger share a common refrigerant path.

4. The heat pump system of claim 1 further comprising a supply air heat exchanger positioned in the supply air channel downstream from the supply air side of the energy recovery module, the supply air heat exchanger fluidly coupled to the regeneration air heat exchanger to enable heat exchange between the supply air and the regeneration air.

5. The heat pump system of claim 1 further comprising a supply air heat exchanger positioned in the supply air channel downstream from the supply air side of the energy recovery module, the pre-processing module sharing a common refrigerant path with the supply air heat exchanger.

6. The heat pump system of claim 1 further comprising a compressor to condition a refrigerant flowing through the pre-processing module and the regeneration air heat exchanger.

7. The heat pump system of claim 1 further comprising a bypass circuit to control a flow of refrigerant to the pre-processing module.

8. The heat pump system of claim 1, wherein the regeneration air side of the energy recovery module transfers the heat and moisture from the regeneration air to the supply air side of the energy recovery module, the supply air side of the energy recovery module heating and humidifying the outside air in the winter mode.

9. The heat pump system of claim 1, wherein the pre-processing module heats the regeneration air from the energy recovery module to prevent saturation of the exhaust air generated by the regeneration air heat exchanger.

10. The heat pump system of claim 1 further comprising a preheater positioned in the supply air channel upstream from the supply air side of the energy recovery module, the preheater heating the outside air in the supply air path.

11. The heat pump system of claim 1 further comprising a supply air heat exchanger positioned in the supply air channel downstream from the supply air side of the energy recovery module, the supply air heat exchanger operating as a condenser in the winter mode.

12. The heat pump system of claim 1, wherein the regeneration air heat exchanger operates as an evaporator in the winter mode.

13. A heat pump system for conditioning air in a space, the system comprising:

a supply air channel to receive air and discharge supply air into the space;

a regeneration air channel to receive regeneration air from the space and discharge exhaust air, the regeneration air channel and the supply air channel separated by a partition;

an energy recovery module having a supply air side positioned in the supply air channel and a regeneration air side positioned in the regeneration air channel, the regeneration air side of the energy recovery module heating and humidifying the regeneration air in the regeneration air channel in a summer mode;

a regeneration air heat exchanger positioned in the regeneration air channel downstream from the regeneration air side of the energy recovery module, the regeneration air heat exchanger heating the regeneration air in the summer mode, the regeneration air heat exchanger discharging the exhaust air; and a pre-processing module positioned in the regeneration air channel between the regeneration air side of the energy recovery module and the regeneration air heat exchanger, the pre-processing module heating the regeneration air from the energy recovery module in the summer mode to lower a condensation temperature and increase efficiency of the regeneration air heat exchanger.

14. The heat pump system of claim 13, wherein the energy recovery module receives and conditions at least one of outside, ambient, mixed or return air.

15. The heat pump system of claim 13, wherein the pre-processing module and the regeneration air heat exchanger share a common refrigerant path.

16. The heat pump system of claim 13 further comprising a supply air heat exchanger positioned in the supply air channel downstream from the supply air side of the energy recovery module, the supply air heat exchanger fluidly coupled to the regeneration air heat exchanger to enable heat exchange between the outside air and the regeneration air.

17. The heat pump system of claim 13 further comprising a supply air heat exchanger positioned in the supply air channel downstream from the supply air side of the energy recovery module, the pre-processing module sharing a common refrigerant path with the supply air heat exchanger.

18. The heat pump system of claim 13 further comprising a compressor to condition a refrigerant flowing through the pre-processing module and the regeneration air heat exchanger.

19. The heat pump system of claim 13 further comprising a bypass circuit to control a flow of refrigerant to the pre-processing module.

20. The heat pump system of claim 13, wherein the supply air side of the energy recovery module transfers heat and moisture from the supply air to the regeneration air side of the energy recovery module transferring the heat and moisture from the supply air to the regeneration air side of the energy recovery module in the summer mode.

21. The heat pump system of claim 13 further comprising a supply air heat exchanger positioned in the supply air channel downstream from the supply air side of the energy recovery module, the supply air heat exchanger operating as an evaporator in the summer mode.

22. The heat pump system of claim 13, wherein the regeneration air heat exchanger operates as a condenser in the summer mode.

23. A heat pump system for conditioning air in a space, the system comprising:
   a supply air channel to receive air and discharge supply air into the space;
   a regeneration air channel to receive regeneration air from the space and discharge exhaust air, the regeneration air channel and the supply air channel separated by a partition;
   a supply air heat exchanger positioned in the supply air channel to condition the supply air in the supply air channel;
   a regeneration air heat exchanger positioned in the regeneration air channel to condition the regeneration air in the regeneration air channel, wherein heat is transferred between the regeneration air heat exchanger and the supply air heat exchanger; and
   a pre-processing module positioned in the regeneration air channel upstream from the regeneration air heat exchanger, the pre-processing module heating the regeneration air in the regeneration air channel.

24. The heat pump system of claim 23, wherein the supply air channel receives at least one of outside, ambient, mixed or return air.

25. The heat pump system of claim 23, wherein the pre-processing module and the regeneration air heat exchanger share a common refrigerant path.

26. The heat pump system of claim 23, wherein the pre-processing module and the supply air heat exchanger share a common refrigerant path.

27. The heat pump system of claim 23, wherein the pre-processing module is fluidly coupled between the regeneration air heat exchanger and the supply air heat exchanger.

28. The heat pump system of claim 23 further comprising a compressor to condition a refrigerant flowing through the pre-processing module.

29. The heat pump system of claim 23 further comprising a bypass circuit to control a flow of refrigerant to the pre-processing module.

30. The heat pump system of claim 23, wherein during a summer mode, the regeneration air heat exchanger operates as a condenser and the supply air heat exchanger operates as an evaporator.

31. The heat pump system of claim 23, wherein during a winter mode, the regeneration air heat exchanger operates as an evaporator and the supply air heat exchanger operates as a condenser.

32. The heat pump system of claim 23 further comprising an energy recovery module having a supply air side and a regeneration air side, the supply air side positioned in the supply air channel upstream from the supply air heat exchanger, the regeneration air side positioned in the regeneration air channel upstream from the regeneration air heat exchanger, the energy recovery module transferring heat and moisture between the regeneration air and the supply air.

33. The heat pump system of claim 23, wherein the pre-processing module heats the regeneration air in a winter mode to prevent frost from forming on the regeneration air heat exchanger.

34. The heat pump system of claim 23, wherein the pre-processing module heats the regeneration air in a winter mode to prevent saturation of the exhaust air generated by the regeneration air heat exchanger.

35. The heat pump system of claim 23, wherein the pre-processing module heats the regeneration air in a summer mode to increase an efficiency of the regeneration air heat exchanger by lowering a condensation temperature.

36. A method for conditioning air in a space, the method comprising:
   positioning a supply air channel adjacent to a regeneration air channel, the regeneration air channel and the supply air channel separated by a partition, the supply air channel receiving air and discharging supply air into the space, the regeneration air channel receiving regeneration air from the space and discharging exhaust air;
   positioning a supply air heat exchanger in the supply air channel to condition the air in the supply air channel;
   positioning a regeneration air heat exchanger in the regeneration air channel to condition the regeneration air in the regeneration air channel;
   transferring heat between the regeneration air heat exchanger and the supply air heat exchanger;
   positioning a pre-processing module in the regeneration air channel upstream from the regeneration air heat exchanger; and
   heating the regeneration air in the regeneration air channel with the pre-processing module.

37. The method of claim 36 further comprising fluidly coupling the pre-processing module and the regeneration air heat exchanger to a common refrigerant path.

38. The method of claim 36 further comprising fluidly coupling the pre-processing module and the supply air heat exchanger to a common refrigerant path.

39. The method of claim 36 further comprising fluidly coupling the pre-processing module between the regeneration air heat exchanger and the supply air heat exchanger.

40. The method of claim 36 further comprising fluidly coupling a compressor to the pre-processing module to condition a refrigerant flowing through the pre-processing module.

41. The method of claim 36 further comprising fluidly coupling a bypass circuit to the compressor control a flow of refrigerant to the pre-processing module.

42. The method of claim 36 further comprising operating the regeneration air heat exchanger as a condenser and operating the supply air heat exchanger as an evaporator in a summer mode.

43. The method of claim 36 further comprising operating the regeneration air heat exchanger as an evaporator and operating the supply air heat exchanger as a condenser in a winter mode.

44. The method of claim 36 further comprising:
   positioning a supply air side of an energy recovery module in the supply air channel upstream from the supply air heat exchanger; and
   positioning a regeneration air side of the energy recovery module in the regeneration air channel upstream from the regeneration air heat exchanger, the energy recovery module transferring heat and moisture between the regeneration air and the supply air.

45. The method of claim 36 further comprising heating the regeneration air with the pre-processing module in a winter mode to prevent frost from forming on the regeneration air heat exchanger.

46. The method of claim 36 further comprising heating the regeneration air with the pre-processing module in a winter mode to prevent saturation of the exhaust air generated by the regeneration air heat exchanger.

47. The method of claim 36 further comprising heating the regeneration air with the pre-processing module in a summer mode to increase an efficiency of the regeneration air heat exchanger.

48. A method conditioning air in a space, the method comprising:
- positioning a supply air channel adjacent to a regeneration air channel, the regeneration air channel and the supply air channel separated by a partition, the supply air channel receiving air and discharging supply air into the space, the regeneration air channel receiving regeneration air from the space and discharging exhaust air;
- positioning a supply air side of an energy recovery module in the supply air channel;
- positioning a regeneration air side of the energy recovery module in the regeneration air channel, the energy recovery module transferring heat and moisture between the regeneration air and the supply air;
- positioning a regeneration air heat exchanger in the regeneration air channel downstream from the regeneration air side of the energy recovery module;
- conditioning the regeneration air with the regeneration air heat exchanger;
- positioning a pre-processing module in the regeneration air channel between the regeneration air side of the energy recovery module and the regeneration air heat exchanger; and
- conditioning the regeneration air in the regeneration air channel with the pre-processing module.

49. The heat pump system of claim 48, wherein the supply air channel receives at least one of outside, ambient, mixed or return air.

50. The method of claim 48 further comprising conditioning the regeneration air with the pre-processing module in a winter mode to prevent frost from forming on the regeneration air heat exchanger.

51. The method of claim 48 further comprising conditioning the regeneration air with the pre-processing module in a winter mode to prevent saturation of exhaust air generated by the regeneration air heat exchanger.

52. The method of claim 48 further comprising heating the regeneration air with the pre-processing module in a summer mode to increase an efficiency of the regeneration air heat exchanger.

53. The method of claim 48 further comprising fluidly coupling the pre-processing module and the regeneration air heat exchanger to a common refrigerant path.

54. The method of claim 48 further comprising:
- positioning a supply air heat exchanger in the supply air channel downstream from the supply air side of the energy recovery module; and
- fluidly coupling the supply air heat exchanger to the regeneration air heat exchanger to enable heat exchange between the outside air and the regeneration air.

55. The method of claim 48 further comprising:
- positioning a supply air heat exchanger in the supply air channel downstream from the supply air side of the energy recovery module; and
- fluidly coupling the pre-processing module and the supply air heat exchanger to a common refrigerant path.

56. The method of claim 48 further comprising fluidly coupling a compressor to the pre-processing module to condition a refrigerant flowing through the pre-processing module.

57. The method of claim 56 further comprising fluidly coupling a bypass circuit to the compressor to control a flow of refrigerant to the pre-processing module.

58. The method of claim 48 further comprising:
- positioning a preheater in the supply air channel upstream from the supply air side of the energy recovery module; and
- heating the air in the supply air channel with the preheater.

59. The method of claim 48 further comprising:
- positioning a supply air heat exchanger in the supply air channel downstream from the supply air side of the energy recovery module;
- operating the supply air heat exchanger as a condenser in a winter mode; and
- operating the supply air heat exchanger as an evaporator in a summer mode.

60. The method of claim 48 further comprising:
- operating the regeneration air heat exchanger as an evaporator in a winter mode; and
- operating the regeneration air heat exchanger as a condenser in a summer mode.

* * * * *